United States Patent

[11] 3,532,129

| [72] | Inventors | Peter Arthur Ward, Hilton; John Albert Mullins, Chellaston; Geoffrey William Morris, Breaston, England |
|---|---|---|
| [21] | Appl. No. | 796,659 |
| [22] | Filed | Feb. 5, 1969 Division of Ser. No. 717,266, March 29, 1968, abandoned. |
| [45] | Patented | Oct. 6, 1970 |
| [73] | Assignee | Rolls-Royce Limited, Derby, England a British company |
| [32] | Priority | April 5, 1967 |
| [33] | | Great Britain |
| [31] | | No. 15602/67 |

[54] SILENCING OF GAS TURBINE ENGINES
1 Claim, 1 Drawing Fig.

[52] U.S. Cl. ................................................. 138/45, 137/15.1
[51] Int. Cl. ................................................. F15d 1/00
[50] Field of Search............................................. 138/45, 46; 137/15.1, 15.2, 16; 60/39.29, 35.6L1(—Located in): 244/53.8

[56] References Cited
UNITED STATES PATENTS

| 2,632,295 | 3/1953 | Price...................... | 60/39.29 |
| 2,705,863 | 4/1955 | Clark et al............... | 138/46 |

*Primary Examiner*—Laverne D. Geiger
*Assistant Examiner*—R. J. Sher
*Attorney*—Cushman, Darby and Cushman ABSTRACT: A gas turbine jet propulsion engine provided with flaps or the like whereby the intake cross sectional area may be selectively reduced to a value which causes the ingoing air to reach sonic velocity, thus effectively providing a block against the egress of noise from the engine compressor. The selective reduction of intake cross sectional area is accomplished by flaps or segment members movable in a generally axial direction with respect to the axis of the engine air intake.

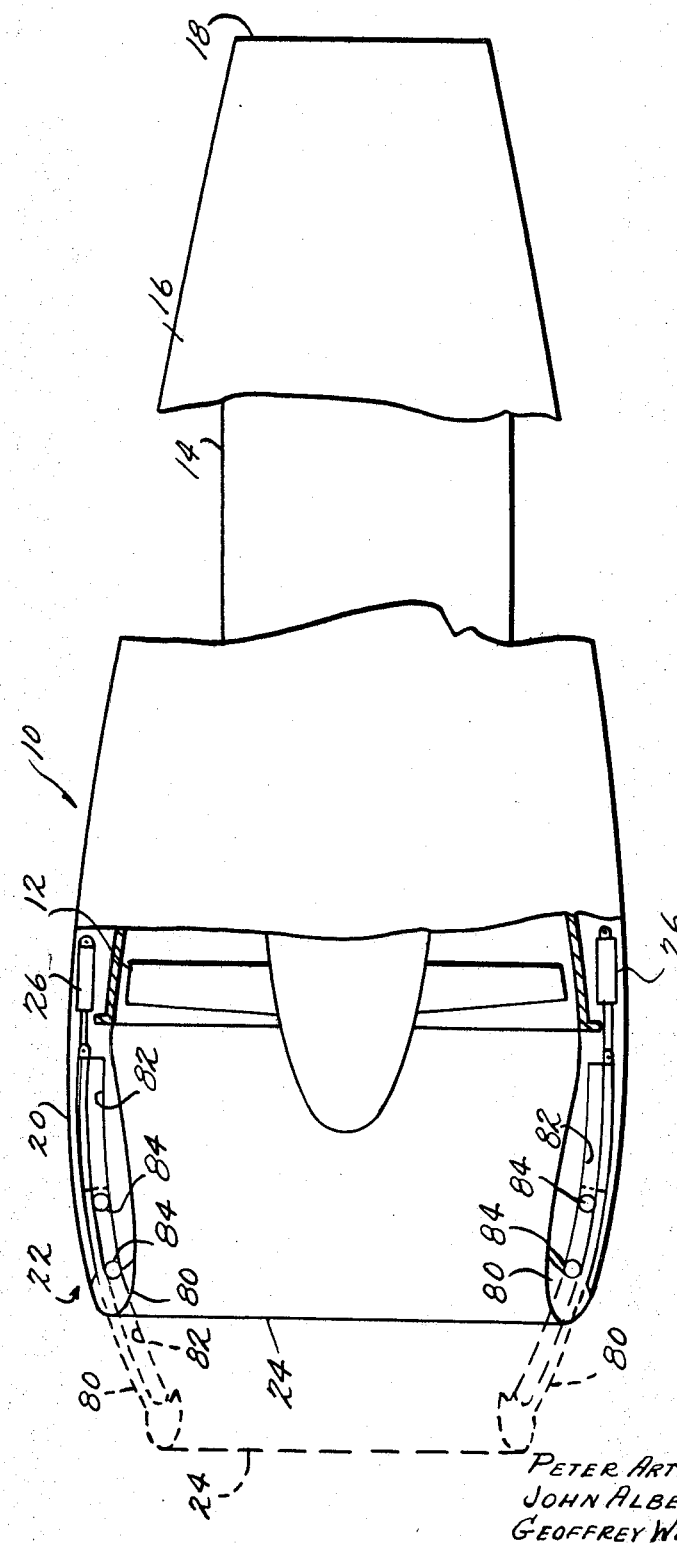
INVENTORS
PETER ARTHUR WARD
JOHN ALBERT MULLINS
GEOFFREY WILLIAM MORRIS
BY Cushman, Darby & Cushman
ATTORNEYS

SILENCING OF GAS TURBINE ENGINES

This application is a division of our co-pending U.S. Application Ser. No. 717,266 filed March 29, 1968 now abandoned.

The present invention relates to the silencing of gas turbine engines and, more particularly, to an improved gas turbine jet propulsion air intake which may be selectively reduced in cross-sectional area to improve the silencing of such engines during aircraft approach and landing as well as while the aircraft is taxiing on the ground.

Considerable engine noise, which may for instance be produced in part by the engine compressor means, normally escapes through the air intake of a gas turbine engine. This engine noise usually predominates at low engine thrust because of reduced jet noise, for example, during taxiing or landing of the aircraft powered by gas turbine engines.

Although low thrust intake noise is on a lower level than high thrust jet noise at a common distance from the engine, this difference is largely offset by lower aircraft altitude on approach than takeoff at a given distance from the end of the runway.

According to the present invention there is provided a gas turbine engine having a casing defining an air intake passage which casing is provided with at least one movable member, means for effecting movement of said member into and out of a position in which it projects into the passage, the movable member when in said position effecting choking of the passage to prevent or reduce engine noise passing therethrough in an upstream direction.

According to another feature of the present invention the air intake for a gas turbine jet propulsion engine may comprise segment members or flaps which are part circular in cross section and are adapted to be movable in a generally axial upstream direction so as to reduce the area of the inlet into the air intake passage to such an extent that the inlet is choked while providing a substantially smooth and uninterrupted continuation of the casing and the air intake passage. The part circular flaps or segment members are adapted, when not in the position for effecting choking of the air intake passage, to be disposed within the casing, each of the flaps or members being supported on rollers or tracks.

It will be appreciated that the flaps or movable members referred to above may be actuated in any convenient manner, for example, hydraulic rams, screw jacks, or the like may be used.

Throughout the specification the term "choked" is intended to refer to the condition which occurs when the flow through an orifice is at sonic velocity whereby noise generated on the downstream side of the orifice can no longer be transmitted upstream thereof.

The present invention provides means for resisting the egress of noise from the compressor and will now be described with reference to the drawing in which a diagrammatic sectional view of a gas turbine engine embodying the air intake of the present invention is disclosed.

In the drawing a gas turbine jet propulsion engine generally designated at 10 includes compressor means 12, combustion means 14, turbine means 16 and a propelling nozzle 18 in flow series. A casing 20 for the engine 10 extends forwardly of the compressor means 12 and forms or defines an air intake 22 for the compressor means 12. The air intake 22 is divergent as it extends from the inlet orifice 24 to the face of the compressor means 14.

Casing 20, which is double walled, as shown in the drawing, has a plurality of arcuate flaps or segment members 80 mounted therein for generally axial movement in an upstream direction. Each of the flaps or segment members 80 which is part circular in cross section and is disposed within the casing 20 has its upstream edge shaped to form at least part of the leading edge of the inlet orifice 24 of air intake 22.

As shown diagrammatically in the drawings, each segment 80 is provided with rails or similar guides 82 arranged to cooperate with rollers 84 or the like in the casing 20. Any suitable means such as hydraulic rams, screw jacks, or the like shown diagrammatically at 26 may be used to actuate the flaps or segment members 80.

The gas turbine jet propulsion engine 10 is suitable for mounting in an aircraft so as to propel it into and through the atmosphere and, while the aircraft is taking off or cruising at in-level flight, the flaps or segment members 80 will be in the position shown in full lines in the drawing. When in this position, the inlet orifice 24 has a cross-sectional area sufficient to permit the required mass flow of air for the engine 10 during takeoff and cruise. When the aircraft is landing or taxiing, the hydraulic rams or screw jacks 26 are actuated to cause the flaps or segment members 80 to move generally axially forward on a converging path so as to restrict the cross-sectional area of the intake orifice 24. At the same time, the engine rotational speed is reduced so as to reduce the mass flow of air required by the engine to a predetermined value. The gas turbine jet propulsion engine 10 still requires the same amount of air as required for landing or taxiing when the inlet orifice is open and, consequently, by reducing the cross-sectional intake area of the inlet orifice, the same amount of air is still sucked through the smaller diameter intake orifice but this causes an increase of the velocity thereof up to sonic speed. By increasing the velocity of the air up to sonic speed, the amount or level of noise being emitted from the compressor is considerably reduced causing an overall effect of the engine being quieter.

We claim:

1. A gas turbine jet propulsion engine air intake comprising a double walled casing having a plurality of flap members mounted between said walls, the flap members being annularly about the intake axis and movable axially, there being guide track means provided such that said axial movement causes the upstream ends of said flaps to converge towards or diverge from the intake axis.